United States Patent [19]

Newman et al.

[11] 4,128,430

[45] Dec. 5, 1978

[54] MASTER SHEETS AND PROCESS FOR PRINTING SAME

[75] Inventors: Douglas A. Newman, Glen Cove; Robert T. Emerson, Manhasset, both of N.Y.

[73] Assignee: Columbia Ribbon and Carbon Manufacturing Co., Inc., Glen Cove, N.Y.

[21] Appl. No.: 631,512

[22] Filed: Nov. 13, 1975

[51] Int. Cl.[2] .................... C09D 11/06; C09D 11/12

[52] U.S. Cl. .................................... 106/31; 101/451; 101/472; 204/159.16; 260/884; 260/DIG. 38

[58] Field of Search ...................... 106/30, 20, 22, 19; 101/473, 451, 472, 468; 260/884, DIG. 38; 204/159.16

[56] References Cited

U.S. PATENT DOCUMENTS

| | | | |
|---|---|---|---|
| 3,207,621 | 9/1965 | Newman et al. | 101/472 |
| 3,359,900 | 12/1967 | Newman | 101/473 |
| 3,404,995 | 10/1968 | Newman | 101/473 |
| 3,458,339 | 7/1969 | Newman | 101/468 |
| 3,459,581 | 8/1969 | Newman | 101/473 |
| 3,510,340 | 5/1970 | Blake et al. | 106/30 |
| 3,847,767 | 11/1974 | Kloczewski | 204/159.15 |
| 3,955,997 | 5/1976 | Sagane et al. | 106/131 |
| 3,963,798 | 6/1976 | Miller | 204/159.15 |
| 4,042,401 | 8/1977 | Newman et al. | 106/19 |

OTHER PUBLICATIONS

Chem. Abst., 79:6635p, 1973.

*Primary Examiner*—Theodore Morris
*Attorney, Agent, or Firm*—Thomas L. Tully

[57] ABSTRACT

Pressure-sensitive master sheets are produced by printing ink-releasing images onto a master sheet by silk screen techniques using a semi-solid printable ink composition comprising a wax and/or resin binder material, an incompatible oleaginous material, colorant and a volatile vehicle. The solidifed printed images comprise a porous, spongy network of the binder material containing within the pores thereof the oleaginous material and colorant as a pressure-exudable ink. The printed master is suitable for the production of several copies in a dry pressure-copying process.

3 Claims, 2 Drawing Figures

MASTER SHEETS AND PROCESS FOR PRINTING SAME

Figure 1:
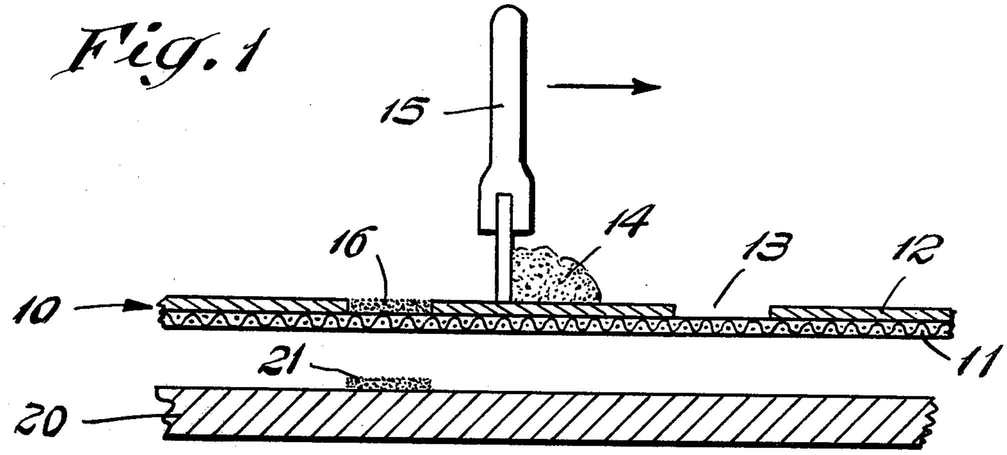

A variety of dry pressure-copying processes are known, including those disclosed in earlier U.S. Pat. Nos. 3,359,900 and 3,595,683. Most known processes involve the use of frangible transfer compositions which are coated onto a carbon paper or ribbon and pressure-transferred to a master sheet in the form of mirror-reverse frangible images which fracture and transfer to a succession of copy sheets pressed thereagainst to form a succession of right-reading duplicate copies. The number of legible copies that can be produced is small, i.e. 15 or 20 at most, and the images are easily smeared and smudged.

The processes of the aforementioned patents overcome these problems by providing frangible transfer compositions which, when pressure-transferred to a master sheet, provide reverse-reading images which are not frangible in the pressure-copying process but which comprise a porous, spongy network of resinous binder material containing a pressure-exudable ink within the pores thereof. Such masters permit a relatively large number of copies to be pressed therefrom, and the right-reading images formed on each copy sheet are absorbed by the copy sheet surface and are resistant to smearing and smudging.

The main disadvantage of the processes of the aforementioned patents is the necessity for forming the images on the master sheet by means of imaging pressure applied against a coated transfer sheet. This requires the initial step of coating the transfer sheet or ribbon with an imaging composition which provides a frangible, pressure-transferable solidified layer and the subsequent steps of bringing the coating transfer sheet or ribbon into contact with the master sheet to be imaged and applying imaging pressure to transfer portions of the solidified layer. This is time-consuming, expensive due to the small amount of transfer composition which is actually used, and sometimes dirty due to the inadvertent transfer of imaging composition to unintended areas of the master sheet because of roller pressures or the like, particularly when used in continuous lengths in high speed printing machines.

It is the principal object of the present invention to provide a simple efficient and rapid method for the production of imaged master sheets suitable for the production of duplicate copies in a dry pressure-duplicating process.

It is another object of this invention to provide a method for printing images onto a master sheet using a printable composition which, when solidified, provides clean, smudge-resistant master images capable of exuding flowable ink to a succession of copy sheets under the effects of pressure.

It is another object of the present invention to provide novel semi-solid printing ink compositions which are capable of being solidified in the form of liquid ink-exuding images which are clean to the touch and smudge-resistant.

Figure 2:
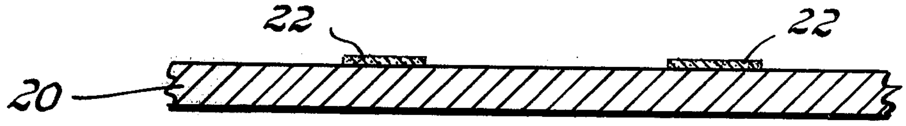

These and other objects and advantages of the present invention will be apparent to those skilled in the art in the light of the present disclosure including the drawing, in which:

FIG. 1 is a diagrammatic cross-section, to an enlarged scale, of a master sheet being imaged with pressure-duplicating composition through a stencil sheet, the sheets being shown out of contact for purposes of illustration, and FIG. 2 is a diagrammatic cross-section, to an enlarged scale, of a master sheet carrying printed pressure-duplicating images which have been solidified.

The objects and advantages of the present invention are accomplished by the imagewise printing of pressure-duplicating printing compositions and the solidification of such images after they have been printed onto the master sheet to form porous, spongy images which are clean to the touch and smudge-resistant and contain pressure-exudable ink capable of being transferred to a succession of copy sheets to form a number of copies.

The silk screen printing process is a generic name for a stencil printing process employing an ink-permeable screen which may be of silk, nylon, polyester, stainless steel or other monofilament or polyfilament thread construction. Portions of the screen are treated or masked to render them impermeable to ink to provide a stencil in which the remaining ink-permeable areas correspond to the images or areas to be printed. The stencil screen is placed on the copy sheet to be printed and the printing ink is drawn across the top of the screen, such as by means of a squeegee, to force the ink through the ink-permeable areas and against the underlying copy sheet. The printed copy sheet is dried by evaporation of the volatile vehicle. The process can be repeated with a number of fresh copy sheets to produce a number of copies from the same stencil screen by repeating the inking step.

Conventional screen printing inks are prepared by grinding strong pigments into a vehicle composed of dehydrated castor oil, compatible synthetic resin, boiled linseed oil and solvent such as kerosene or solvent naphtha to provide a short ink which will run over the screen easily, wet the surface of the copy sheet with a small amount of ink and will permit easy separation of the screen and the printed copy. The printed images dry on the copy sheet by absorption into the copy paper, evaporation of the solvent and combination of the oils and resin binder.

The pressure-copying printing compositions of the present invention are of the solvent type, with wax and/or resin as the binder material. In all cases the printing composition is semi-solid under conditions of use so that the composition will form a relatively heavy deposit on the master sheet in the form of images which will not flow or run on the master sheet to form broad or distorted printed images. Thus, wax-base compositions contain an amount of a volatile vehicle sufficient to provide a semi-solid consistency, during the printing operation, while resin-base compositions contain sufficient volatile solvent for the resin so as to be semi-solid or thixotropic, i.e. non-flowable in the absence of applied force.

In all cases the compositions of the present invention comprise a solidifiable binder material, such as wax and/or resin, coloring matter, such as dissolved dyestuff, and a pressure-flowable ink vehicle which is non-volatile, substantially incompatible with the binder material and is a solvent for the coloring matter.

The volatile solvent or vehicle used is one having an evaporation temperature above about 200° F., such as naphtha, mineral spirits, kerosene, toluene, xylene, or the like. Boiling points between about 200° F. and 460° F. are preferred. The high boiling point solvents are necessary to prevent the solvent compositions from drying on the printing screen and causing blockage thereof due to premature evaporation of the volatile solvent.

Referring to the drawing, FIG. 1 illustrates a stencil sheet 10 comprising a silk screen 11 covered by an impervious masking layer 12 from which portions have been removed to provide open image areas 13 corresponding in mirror-reverse to the images to be duplicated, and a conventional master sheet 20 (shown in spaced relation for purposes of illustration).

The semi-solid duplicating composition 14 is drawn across the barrier layer 12 by means of a conventional silk screen squeegee 15 whereby portions 16 of the composition are forced into open areas 13, through the silk screen 11 and against the surface of the master 20 to form printed images 21 thereon corresponding to the open areas of the stencil sheet 10.

Next, the stencil sheet 10 is carefully separated from the imaged master sheet 20 and the master sheet is treated to solidify the semi-solid images 21. This is accomplished by drying the master sheet such as by applying heat and/or forced air to evaporate the volatile solvent or vehicle from the images.

The solidified, pressure-duplicating images 22 on the master sheet, as shown by FIG. 2, comprise a skeletal microporous structure of the binder material, i.e. wax and/or resin, which is bonded to the surface of the master sheet and which contains within the pores thereof a pressure-exudable, flowable ink comprising the incompatible oleaginous material and the coloring matter which preferably comprises a small amount of dye dissolved in the oleaginous material.

According to one embodiment of the present invention, the ink vehicle which is incompatible with the resin and/or wax binder material to form the pressure-exudable ink containing the coloring matter comprises or consists of a liquid material which is curable or polymerizable under the effects of applied heat or ultraviolet radiation to form a solid, permanent deposit. For instance, the ink vehicle may comprise any of the known monomers or prepolymers which are polymerizable under the effects of applied ultraviolet radiation, such as pentaerithritol triacrylate, conventionally used in known u.v.-curable printing inks. Also, heat-polymerizable monomers or prepolymers such as trimethylol propane triacrylate are suitable provided that the monomer or prepolymer is one which is stable at the temperature used to dry the microporous ink layer. In both cases it is conventional to include a small amount of a polymerization inhibitor such as pyrogallol to prevent polymerization under ambient conditions, as well as a polymerization initiator or catalyst such as 9,10-anthraquinone, lauroyl peroxide, or the like, to assist the polymerization reaction under conditions of applied radiation rich in ultraviolet or rich in infrared or other heating means.

According to this embodiment, the pressure-exudable ink comprising the liquid polymerizable monomer or prepolymer and coloring matter remains stable as a pressure-flowable liquid ink under ambient conditions so that the master images can exude the ink to a succession of copy sheets under the effects of applied overall pressure. Thereafter the duplicate images formed on each copy sheet, which consist of the liquid ink, can be treated by exposure to the polymerization-causing means, such as a light source rich in ultraviolet or infrared or by hot air or conducted heat, radio frequency, electron bombardment or other means depending upon the nature of the polymerizable monomer and/or prepolymer.

The polymerization reaction cures the images formed on each copy sheet so that the images are rendered permanent and non-removable by conventional image lift-off correction tapes and/or heating devices used in connection therewith. This feature is most important for fraud-prevention purposes where the duplicate copy is an important document such as a record, a bond or stock certificate, a check or other valuable paper.

The polymerizable monomer and/or prepolymer may be a liquid which serves as the sole ink vehicle or is used in combination with an oily liquid ink vehicle with which it is miscible. Also solid monomers or prepolymers may be used provided they are soluble in the oily ink vehicle with which they are used. The important requirement is that the monomer or prepolymer must be present in the ink phase, which is incompatible with the microporous wax and/or resin sponge of the master images, in liquid pressure-exudable form.

The surface of the master sheet supporting the pressure-duplicating images preferably is one which cannot absorb the ink from the images since otherwise the capacity of the images to produce a large number of copies is reduced. This is particularly important in the case of imaged master sheets which are to be used periodically to produce a few copies at a time and are stored between usages. In such cases it is also preferable that the rear surface of the master sheet cannot absorb ink from the surface of images stored in contact therewith when a number of imaged masters are stored in superposed relationship or when the master is a continuous web which is wound in a roll for storage.

The preferred master sheets are paper sheets impregnated with an oil-resistant, oleophobic composition such as chrome complex materials available under the Trademarks Quilon and Scotch Gard, and provided on the front surface with an image-receptive continuous oil-barrier layer such as one applied from an aqueous emulsion of polyvinylidene chloride resin. Plastic film master sheets are quite suitable, particularly those treated to have an image-receptive surface, as are synthetic plastic film "paper" and the like.

The imaged master sheet is suitable for the production of up to fifty or more copies in a conventional pressure duplicator whereby the imaged surface of the master is pressed against a succession of copy sheets, such as paper sheets, which absorb the colored ink pressed from the mirror-reverse master images to form correct-reading duplicates of the images present on the master sheet. If desired, heat may be applied to the master and/or to the copy sheets during the duplicating process in order to render the ink of the master images more flowable, particularly in cases where the oleaginous ink vehicle comprises a semi-solid material such as lanolin or the like.

The volatile vehicle-applied duplicating compositions of the present invention may be of two types. The preferred type comprises a synthetic thermoplastic resin which is soluble in the volatile vehicle while the second type comprises a finely-divided particulate wax or synthetic thermoplastic resin which is mainly dispersed in the volatile coating vehicle although some amount of the binder is generally dissolved therein. The preferred compositions are of the solvent type and comprise a minor amount by weight of the resinous binder material and a major amount by weight of an oleaginous material which is substantially incompatible with the binder material and which may comprise a polymerizable monomer and/or prepolymer, and a small amount of coloring matter, preferably a dye which is dissolved in the oleaginous material. The volatile solvent used is a solvent for the binder material and for the oleaginous material and has a boiling point between about 200° F. and 460° F. Suitable solvents include water, naphtha, kerosene, methylated spirits, toluene, xylene, and the like. The binder material is vinyl chloride-vinyl acetate copolymer but any of the other resinous binder materials, oleaginous vehicles and colorants disclosed in aforementioned U.S. Pat. No. 3,595,683 may also be used.

The compositions of the second type, i.e. those having a particulate binder material dispersed in a volatile vehicle which may also be a partial solvent, must be so formulated that the undissolved binder particles are sufficiently fine to pass through the silk screen, i.e. smaller than about 10 microns for a wider mesh screen and smaller than 5 microns for screens down to about 250 mesh in size. This requirement applies to any solid material, such as pigment or filler, which may be present in any of the compositions of the present invention. The dispersing vehicle must have a boiling point between about 200° F. and 460° F. and may be any of the liquids listed supra as solvents for the solvent composition. The dispersing vehicle for both types of compositions comprises from about 40% to 20% of the total composition, whereby the solids content ranges between 60% and 80% to provide a semi-solid or thixotropic composition, i.e. one which is substantially non-flowable except under the effects of applied force.

The dispersed binder material may be a hard wax such as carnauba, montan, microcrystalline, paraffin, beeswax, or the like, or may be a synthetic thermoplastic resin in the form of an emulsion, dispersion, latex, or the like. Preferred dispersed resins include polyethylene, polyvinyl acetate, acrylic esters, polyvinylidene chloride, and the like.

The dispersed compositions, whether based upon wax and/or resin binder materials, generally contain a major amount by weight of an incompatible oleaginous material such as an animal, vegetable or mineral oil or an oily acid, such as oleic acid, or any oily ester, such as butyl stearate, together with a small amount of the coloring matter.

The dispersed compositions are dried after the printing step by applying heat to evaporate the volatile vehicle and then preferably are heat-fused sufficiently to cause the wax and/or resin particles to stick to each other and to the surface of the master sheet. The amount of heat applied, preferably by means of exposure to infrared radiation, is insufficient to coalesce the binder particles together and destroy the porosity of the images provided by the spaces between contacting binder particles. Where infrared heating is employed, it is preferred to include a small amount of an infrared radiation-absorbing material such as carbon black in the duplicating composition. As discussed supra, where the images formed on the copy sheets contain a polymerizable ink vehicle, the images are subjected to polymerization conditions to cause them to cure and become permanent.

The following examples of suitable pressure-copying compositions of various types are given as illustrative of the present invention and should not be considered limitative.

EXAMPLE 1

| Ingredients | Parts by Weight |
|---|---|
| Vinyl chloride-vinyl acetate copolymer | 4.5 |
| Polystyrene | 6.4 |
| Oleic acid | 20.0 |
| Lanolin | 3.7 |
| Clay | 27.0 |
| Methyl violet dye | 6.4 |
| Methyl ethyl ketone | 22.0 |
| Toluol | 10.0 |

The resinous binder materials are dissolved in the volatile solvents and then the oleic acid and dye are added and stirred to form a uniform mixture. The mixture is placed in a ball mill and the lanolin and clay are added and the combination is milled for several hours to form a semi-solid printing ink suitable for use in accordance with the printing procedure outlined hereinbefore.

EXAMPLE 2

| Ingredients | Parts by Weight |
|---|---|
| Montan wax | 6.0 |
| Microcrystalline wax | 8.0 |
| Carnauba wax | 5.0 |
| Ethyl cellulose | 6.5 |
| Oleic acid | 11.0 |
| Mineral oil | 8.0 |
| Lecithin | 0.5 |
| Lanolin | 4.0 |
| Crystal violet dye | 4.0 |
| Clay | 18.0 |
| Mineral spirits | 29.0 |

The oleic acid and ethyl cellulose are combined in a steam heated kettle. The waxes, oils and lecithin are ground together in a ball mill with the mineral spirits solvent. The combined oleic acid and ethyl cellulose are then added to the ball mill as a clear liquid, and finally the lanolin, dye and clay are added to the ball mill and the ingredients are milled for about two hours to form a semi-solid printing ink which is useful in the same manner as the ink of Example 1.

Variations and modifications may be made within the scope of the claims and portions of the improvements may be used without others.

We claim:

1. A semi-solid printing ink composition comprising a solidifiable, oil-resistant binder material from the group consisting of wax, resin and mixtures thereof, at least one non-volatile liquid material which is substantially incompatible with said binder material and which comprises at least one acrylic resin-forming material which is stable at ordinary room temperatures but which is capable of undergoing polymerization when exposed to activating conditions, a quantity of coloring matter which is soluble in said liquid material, and a sufficient amount of a volatile liquid having a boiling point within the range of from about 200° F. to about 460° F. to render said composition substantially non-flowable at ordinary room temperatures in the absence of applied force said ink composition being printable in image form onto a master sheet and solidifiable by evaporation of said volatile liquid, without causing said resin-forming material to polymerize, to form images having a skeletal microporous structure of said binder material bonded to said master sheet and containing within the pores thereof said non-volatile liquid comprising said resin-forming material and dissolved coloring matter as a flowable ink which is pressure-exudable from said images to form a multiplicity of duplicate images which can be exposed to activating conditions to polymerize said resin-forming material and render said duplicate images resistant to removal.

2. A semi-solid printing ink composition according to claim 1 in which said binder material is a synthetic thermoplastic resin and the volatile liquid is a solvent for said resin.

3. A semi-solid printing ink composition according to claim 1 in which said binder material comprises at least one wax which is at least partially dispersed in said volatile liquid.

* * * * *